US012767113B2

(12) United States Patent
Frea et al.

(10) Patent No.: US 12,767,113 B2
(45) Date of Patent: Oct. 20, 2026

(54) METHODS FOR VERIFYING THE OPERATION OF AT LEAST ONE BRAKING MEANS OF AT LEAST ONE VEHICLE AND CORRESPONDING VERIFICATION SYSTEMS

(71) Applicant: Faiveley Transport Italia S.P.A., Piossasco (IT)

(72) Inventors: Matteo Frea, Cantalupa (IT); Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 0 days.

(21) Appl. No.: 18/878,515

(22) PCT Filed: Jun. 20, 2023

(86) PCT No.: PCT/IB2023/056376
§ 371 (c)(1),
(2) Date: Dec. 23, 2024

(87) PCT Pub. No.: WO2023/248130
PCT Pub. Date: Dec. 28, 2023

(65) Prior Publication Data
US 2025/0381945 A1 Dec. 18, 2025

(30) Foreign Application Priority Data
Jun. 21, 2022 (IT) ........................ 102022000013075

(51) Int. Cl.
*B60T 17/22* (2006.01)
*B61L 25/02* (2006.01)

(52) U.S. Cl.
CPC .......... *B60T 17/228* (2013.01); *B60T 17/221* (2013.01); *B61L 25/021* (2013.01)

(58) Field of Classification Search
CPC ................. B60T 17/221; B60T 17/228; B60T 2270/406; B60L 15/0027; B60L 15/0081;
(Continued)

(56) References Cited

U.S. PATENT DOCUMENTS

2002/0148690 A1* 10/2002 Wirth ...................... F16D 66/00
374/E1.004
2004/0036351 A1 2/2004 Mayer et al.
(Continued)

FOREIGN PATENT DOCUMENTS

DE 19510755 A1 10/1996
EP 3842300 A1 6/2021
(Continued)

OTHER PUBLICATIONS

International Search Report and Written Opinion for corresponding PCT Application No. PCT/IB2023/056376, dated Oct. 6, 2023.

*Primary Examiner* — Hai H Huynh
*Assistant Examiner* — Johnny H Hoang
(74) *Attorney, Agent, or Firm* — K&L Gates LLP

(57) ABSTRACT

Methods are described for verifying the operation of at least one braking means of at least one vehicle (V), particularly at least one railway vehicle. A method comprises determining that the at least one braking means (200) is malfunctioning when an actual acceleration value is different from an expected acceleration value. A further method comprises determining that at least one braking means (200) is malfunctioning when an actual acceleration reduction value is different from an expected acceleration reduction value. Yet a further method comprises determining that at least one braking means (200) is malfunctioning when an actual braking force value is different from a verification braking
(Continued)

force value (Fa). Corresponding systems for verifying the operation of at least one braking means of at least one vehicle are also described.

20 Claims, 6 Drawing Sheets

(58) Field of Classification Search
CPC .. B60L 25/021; F16D 66/00; F16D 2066/003; F16D 2066/005; F16D 2066/006
USPC ........................................................ 701/19–20
See application file for complete search history.

(56) References Cited

U.S. PATENT DOCUMENTS

| | | | | |
|---|---|---|---|---|
| 2011/0231039 | A1* | 9/2011 | Leitel | B60T 8/329 701/19 |
| 2014/0343767 | A1* | 11/2014 | Oswald | B60T 8/1705 701/19 |
| 2014/0343769 | A1 | 11/2014 | Breuer et al. | |
| 2016/0144876 | A1* | 5/2016 | Leitel | G01P 3/22 246/122 R |
| 2017/0178426 | A1* | 6/2017 | Ezawa | B61K 9/00 |
| 2017/0278319 | A1* | 9/2017 | Jung | G01L 5/286 |
| 2024/0278763 | A1* | 8/2024 | Jundt | B60T 17/22 |

FOREIGN PATENT DOCUMENTS

| | | | |
|---|---|---|---|
| WO | 2019012730 | A1 | 1/2019 |
| WO | 2020258513 | A1 | 12/2020 |
| WO | 2023248130 | A1 | 12/2023 |

* cited by examiner

METHODS FOR VERIFYING THE OPERATION OF AT LEAST ONE BRAKING MEANS OF AT LEAST ONE VEHICLE AND CORRESPONDING VERIFICATION SYSTEMS

CROSS-REFERENCE TO RELATED APPLICATIONS

This application is a U.S. National Stage Entry under 35 U.S.C. § 371 of International Patent Application No. PCT/IB2023/056376, entitled METHODS FOR VERIFYING THE OPERATION OF AT LEAST ONE BRAKING MEANS OF AT LEAST ONE VEHICLE AND CORRESPONDING VERIFICATION SYSTEMS, filed Jun. 20, 2023, which claims priority to Italian Application No. 102022000013075, filed Jun. 21, 2022, the entire disclosures of which are hereby incorporated by reference herein.

TECHNICAL FIELD

The present invention generally relates to the field of braking systems. In particular, the invention relates to methods for verifying the operation of at least one braking means of at least one vehicle, in particular at least one railway vehicle, and to systems for verifying the operation of at least one braking means of at least one vehicle, in particular at least one railway vehicle. The verification of the operation, i.e. the diagnosis, may also be carried out in real time.

PRIOR ART

The prior art will be described below with particular reference to the field of railway vehicles. The above may be applied similarly, where possible, also to vehicles of other fields traveling by rail.

After the activation of a railway vehicle or a railway convoy including several railway vehicles, before its entry into service, for example daily operation, an action known to those skilled in the art as a "brake test" is carried out. This action is necessary to verify the correct operation of the one or more braking means of a braking system, as a whole of the railway vehicle or of the railway convoy.

The "brake test" is performed with different methods depending on the composition of the type of one or more railway vehicles and the composition of the railway convoy.

In the case of the latest generation of railway convoys, known as fixed composition, the brake test is generally automated. For example, by means of pressure sensors connected to braking cylinders of a braking system, the braking control means (e.g. computer) check that the pneumatic braking pressures controlled by them are actually present at said braking cylinders, within predetermined tolerance bands.

However, this type of automatic check is not able to verify that the braking cylinder of the braking system generates the braking force, corresponding to the braking pressure, to a pad-disc or shoe-wheel clutch pair. Malfunctions of the braking cylinder may for example vary the nominal pressure/force ratio by locally reducing the braking force generated by the braking means.

In the case of freight convoys, consisting for example of a locomotive and a plurality of railway vehicles (e.g. freight wagons), there is no information means of communication between said locomotive and the connected railway vehicles. In this case, the "brake test" includes a procedure which involves an operator, who is asked to check, at least visually, that in the absence of pneumatic braking pressure the shoe 103 of the various braking means is detached from the wheel, or that the pad of the various braking means is detached from the disc. The operator should also check that in the presence of pneumatic braking pressure, the shoe is in contact with the wheel, or the pad is in contact with the disc.

This procedure requires an extremely long time, as for the visual verification the operator is forced to walk along the railway vehicle or railway convoy on each side, in all its length. This procedure is carried out in the case of braking applied by the various braking means and then repeated in the case of braking released by the various braking means. Furthermore, the visual analysis does not ensure that, when visually the braking is applied, the pressure actually applied to the braking cylinders corresponds to the nominal one, concealing hidden faults to one or more pneumatic components in the braking force generation chain.

The problem relating to the "brake test" was previously described with reference to pneumatic braking systems. However, the same problem may be found likewise in electro-pneumatic or electromechanical braking systems and in the related braking application means.

Recent technological developments propose to provide each railway vehicle with a self-powered data acquisition system through "energy harvesting" systems, connected to appropriate pressure and force sensors, provided with wireless communication means, and capable of transmitting to the ground data related to the brake test during the "brake test" step.

As much as the proposed system works, it implies a high cost both in terms of hardware components and in terms of installation and upgrade costs for the complete fleet.

Furthermore, since the "brake test" is a procedure inherent to safety in operation, it may imply onerous costs of development and certification in accordance with the safety standards in force (EN50126, EN50128, EN50129) as regards the data acquisition and especially transmission system.

In the field of vehicles with rubber wheels, equipment is available for periodically checking a braking system comprising one or more braking means, where the vehicle under test is first positioned on rollers which impart rotation to the wheels and, subsequently, the one or more braking means of the vehicle under test are activated. Finally, the braking torque imparted to the rollers is measured. Based on this measurement, the efficiency of the braking system is evaluated. Obviously, this approach may not be applied in the case of rail vehicles, e.g. a railway vehicle or a railway convoy, at the beginning of each daily mission, due to the complexity of application on each axle of each vehicle making up the railway convoy and due to the time required to perform it.

SUMMARY OF THE INVENTION

An object of the present invention is to provide a solution which allows a possible malfunction of at least one braking means of at least one vehicle arranged to run on rails to be detected.

A further object of the present invention is therefore to provide effective solutions which do not involve high costs as regards both the hardware components and the installation and upgrade costs of a possible complete fleet.

A further object is to provide solutions which do not involve onerous development and certification costs.

The above and other objects and advantages are achieved, according to one aspect of the invention, by methods for verifying the operation of braking means of at least one vehicle having the features defined in the respective independent claims 1, 4 and 8, and according to a further aspect of the invention, by systems for verifying the operation of at least one braking means of at least one vehicle having the features defined in the respective independent claims 17, 18, 21, 23 and 24. Preferred embodiments of the invention are defined in the dependent claims, the content of which is to be understood as an integral part of the present description.

BRIEF DESCRIPTION OF THE DRAWINGS

The functional and structural features of some preferred embodiments of methods for verifying the operation of at least one braking means of at least one vehicle and of systems for verifying the operation of at least one braking means of at least one vehicle according to the invention will now be described. Reference is made to the accompanying drawings, wherein.

DETAILED DESCRIPTION

Figure 1:
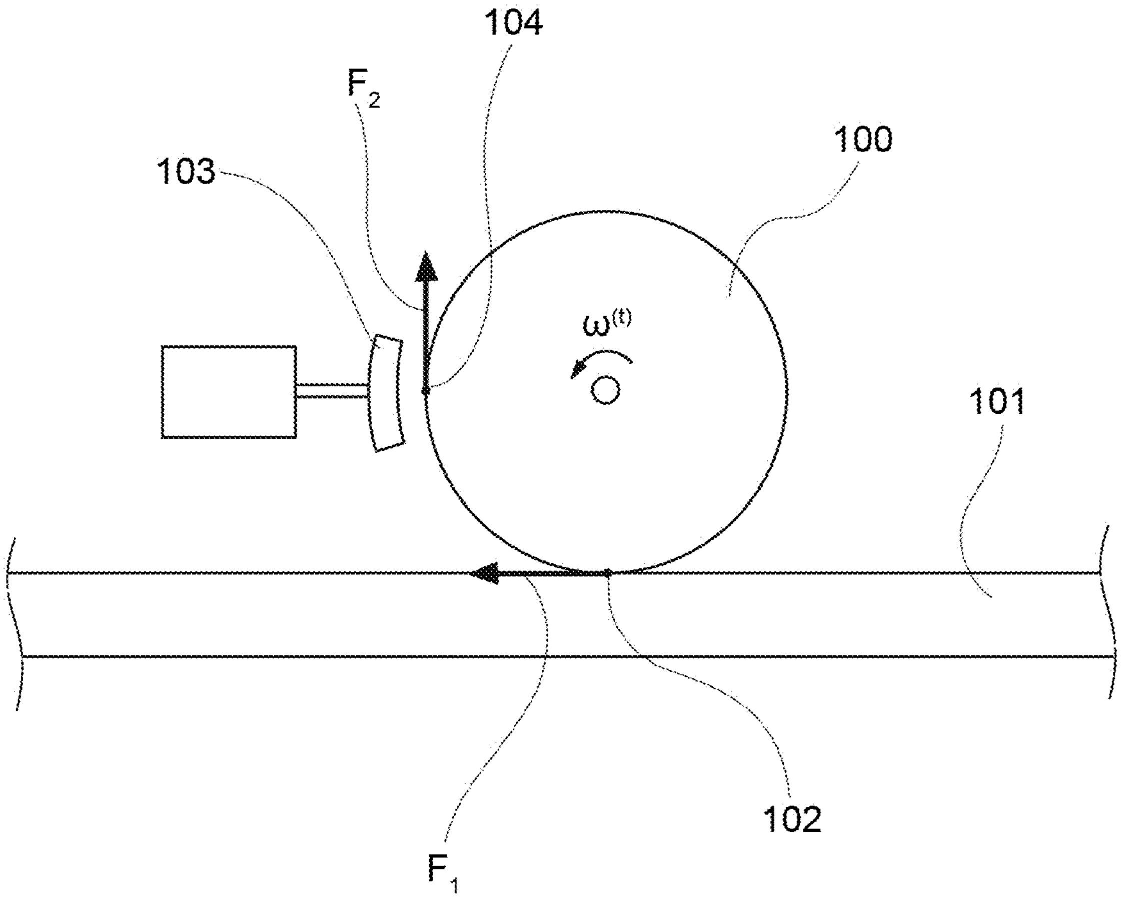
FIG. 1 illustrates by way of example a braking cylinder and a shoe of braking means, which are arranged to act on a wheel in transit in contact on a rail.

Before explaining in detail a plurality of embodiments of the invention, it should be clarified that the invention is not limited in its application to the design details and configuration of the components presented in the following description or illustrated in the drawings. The invention may assume other embodiments and be implemented or constructed in practice in different ways. It should also be understood that the phraseology and terminology have a descriptive purpose and should not be construed as limiting. The use of "include" and "comprise" and the variations thereof are intended to cover the elements set out below and the equivalents thereof, as well as additional elements and the equivalents thereof.

Furthermore, throughout the present disclosure and in the claims, the terms and expressions indicating positions and orientations, such as "longitudinal", "transverse", "vertical" or "horizontal", refer to a generic ground 205 longitudinal to the travel direction of the one or more vehicles.

As regards the figures, a side view is used and what is shown and described for a wheel supported on a respective rail may be understood as duplicated and applied to a pair of wheels constrained by an axle, and to two rails constituting a track, wherein each rail is associated with a respective wheel.

Observing for example FIG. 1, a braking means of the shoe-on-wheel type is illustrated. A person skilled in the art is able to apply the present invention in a similar way also to a braking means of the pad-on-disc type. With reference to such figure, hereinafter it is explained in detail by way of example how a friction force F1 may be generated at the contact point 102 between the wheel and the rail.

The wheel 100 has angular speed ω(t) and rests on a rail 101 at the contact point 102. For example, the actuation of a show may generate a braking force $F_2$ on the wheel 100 at a point 104.

At the point of contact 102 between the wheel 100 and the rail 101, the friction force $F_1$ will consequently be generated.

The friction force $F_1$ generated will cause a deceleration of the angular speed @(t) with which the wheel rotates and will cause a slowdown (i.e. a decrease in acceleration) of the vehicle.

Figure 2:
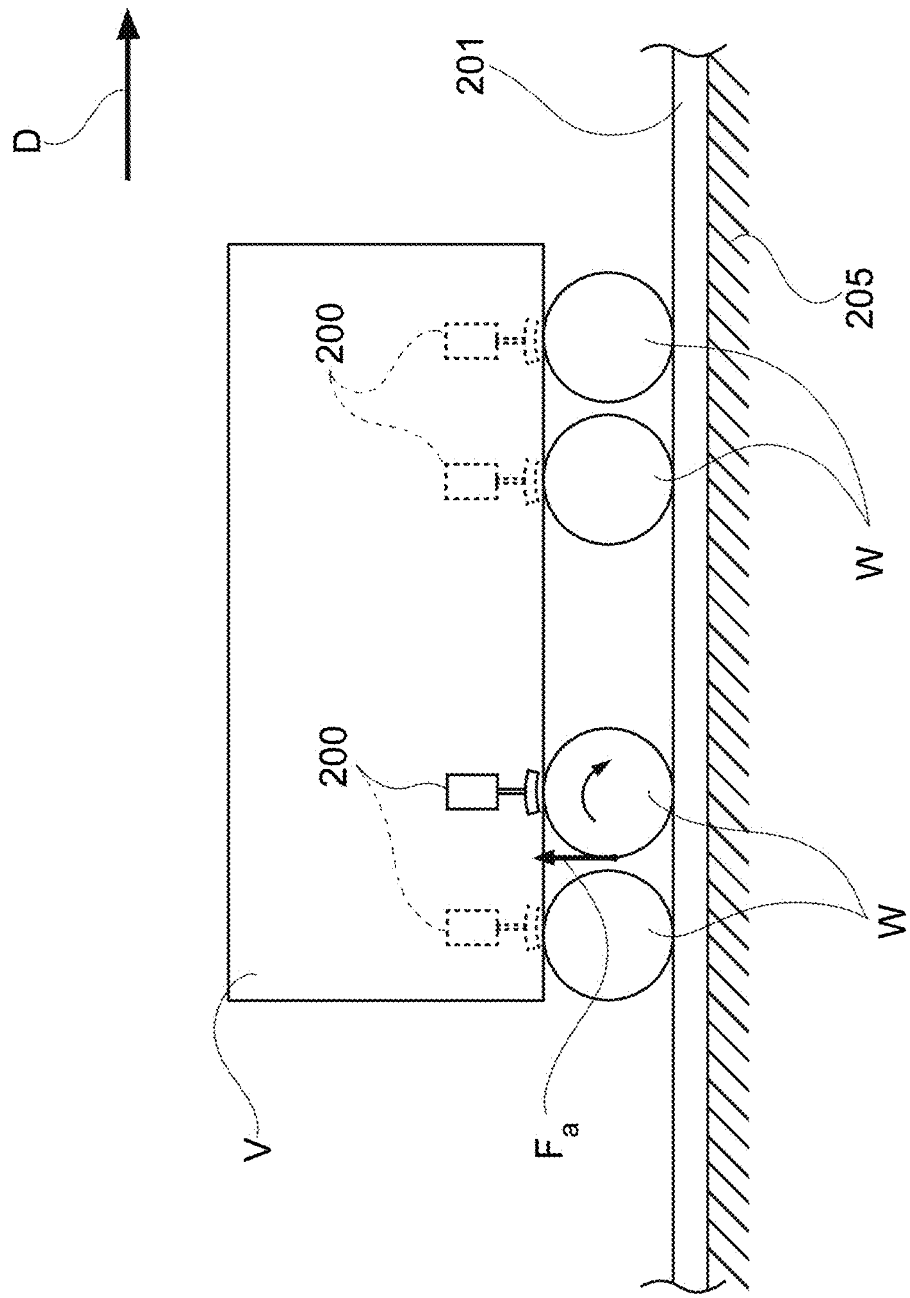
FIG. 2 illustrates an exemplary vehicle running on a rail.

FIG. 2 illustrates an exemplary vehicle V running on a rail. The vehicle runs on the rail in a direction of travel indicated by arrow D.

A first embodiment of a method for verifying the operation of at least one braking means 200 of at least one vehicle V, in particular at least one railway vehicle, is described below.

In this first embodiment, the at least one vehicle V comprises:

- at least one wheel W or at least one axle to which at least one wheel W is coupled; the at least one wheel is adapted to run on a rail 201;
- at least one braking means 200 associated with the at least one wheel W or associated with the at least one axle.

In this first embodiment, the method for verifying the operation of at least one braking means comprises the steps described below.

Step a): moving the at least one vehicle V along said rail 201.

In other words, the vehicle V is moved along the rail.

Step b): providing the at least one braking means 200 with an actuation signal adapted to request the at least one braking means 200 to generate a braking force having a predetermined verification braking force value Fa on the at least one wheel W or on the at least one axle.

In other words, in step b) the braking means 200 is required to generate a braking force value Fa on the at least one wheel W or on the at least one axle.

Step c): when the at least one braking means 200 is required to generate a braking force having the predetermined verification braking force value Fa on the at least one wheel or on the at least one axle, measuring an actual acceleration value of the at least one vehicle.

In other words, in step c) an effective acceleration value of the at least one vehicle which is present when the at least one braking means should generate the braking force having the predetermined verification braking force value Fa is measured. Clearly, in case of correct operation of the at least one braking means 200, when the at least one braking means is required to generate the braking force having the predetermined verification braking force value Fa, the at least one braking means will generate a braking force having the predetermined verification braking force value Fa. Conversely, in the event of a malfunction of the at least one braking means 200, even if the at least one braking means was required to generate the braking force having the predetermined verification braking force value Fa, the at least one braking means 200 may not have generated any braking force or may have generated a braking force having a value other than said predetermined verification braking force value Fa. The effective acceleration value will therefore be a function of the braking force value which has actually been generated by the at least one braking means.

Step d): comparing the actual acceleration value with an expected acceleration value.

In other words, in step d) the measured actual acceleration value is compared with an expected acceleration value, which is the value to be expected when the braking means works correctly and generates the braking force having the predetermined verification braking force value Fa.

Step e): determining that the at least one braking means 200 is malfunctioning when the actual acceleration value is different from the expected acceleration value.

Finally, in step e) it is determined that the at least one braking means is malfunctioning when the effective acceleration value is different from the expected acceleration value, which was expected in the event that the braking means had functioned correctly by generating the braking force having the predetermined verification braking force value Fa.

Preferably, in step a), the at least one vehicle V may be moved along the rail according to a travel acceleration value. In this case, the expected acceleration value may be determined as a function of at least the predetermined verification braking force value Fa and the travel acceleration value with which the at least one vehicle is moved in step a).

Step e) may preferably comprise:

e') verifying whether said actual acceleration value differs from said expected acceleration value by at least a predetermined tolerance value;

e'') determining that the at least one braking means is malfunctioning, if it has been verified that said actual acceleration value differs from said expected acceleration value by at least said predetermined tolerance value.

In other words, the difference must be greater than or equal to a predetermined tolerance value in order for the at least one braking means 200 to be considered malfunctioning. In this way, the risk that any normal physiological variations of the actual acceleration value are recognized as malfunctions of the at least one braking means 200 is reduced.

A numerical example referring to the first embodiment is illustrated below. By means of the actuation signal, the at least one braking means 200 is required to generate a braking force having a predetermined verification braking force value Fa=4 kN. In the light of the verification braking force value Fa=4 kN, an effective acceleration value of 0.6 $m/s^2$ is envisaged (which may be a reduced acceleration value with respect to a vehicle acceleration present prior to the activation of the braking means, for example equal to 1 $m/s^2$). However, due to a failure of at least one braking means, the effective braking force value actually generated is equal to 3 kN (i.e. smaller than the verification braking force value Fa). In view of this lack of braking force, an effective acceleration value of at least one vehicle greater than the expected acceleration reduction value will be measured. For example, the determined effective acceleration value will be 0.7 $m/s^2$. Since the actual acceleration value determined is different from the expected acceleration value, it will be determined that the at least one braking means 200 is malfunctioning.

A second embodiment of a method for verifying the operation of at least one braking means of at least one vehicle, in particular at least one railway vehicle, is described below. For this embodiment, reference may again be made to FIG. 2.

Also in this second embodiment, the at least one vehicle V comprises:

at least one wheel W or at least one axle to which at least one wheel is coupled; the at least one wheel is arranged to run on a rail;

at least one braking means 200 associated with the at least one wheel W or associated with the at least one axle;

In this second embodiment, the method for verifying the operation of at least one braking means comprises the steps described below.

Step a): moving the at least one vehicle V along the rail 201.

In other words, vehicle V is moved along rail 201.

Step b): providing the at least one braking means 200 with an actuation signal adapted to request the at least one braking means 200 to generate a braking force having a predetermined verification braking force value Fa on the at least one wheel W or on the at least one axle.

In other words, in step b) the at least one braking means 200 is required to generate a braking force value Fa on the at least one wheel W or on the at least one axle.

Step c): when said at least one braking 200 is required to generate a braking force having the predetermined verification braking force value Fa on the at least one wheel W or on the at least one axle, determining an actual acceleration reduction value of the at least one vehicle which is caused by an actual braking force generated by the at least one braking means in response to the received actuation signal.

In other words, in step c) an effective acceleration reduction value of the at least one vehicle which is present when the at least one braking means should generate the braking force having the predetermined verification braking force value Fa is determined. Clearly, in case of correct operation of the at least one braking means, when the at least one braking means 200 is required to generate the braking force having the predetermined verification braking force value Fa, the at least one braking means 200 will generate a braking force having the predetermined verification braking force value Fa. Conversely, in the event of a malfunction of the at least one braking means, even if the at least one braking means was required to generate the braking force having the predetermined verification braking force value Fa, the at least one braking means 200 may not have generated any braking force or may have generated a braking force having a value other than said predetermined verification braking force value Fa. The effective acceleration reduction value will therefore be a function of the braking force value which has actually been generated by the at least one braking means 200.

Step d): comparing the actual acceleration reduction value with an expected acceleration reduction value.

In other words, in step d) the effective acceleration reduction value determined is compared with an expected acceleration reduction value, which is a value that is expected in the event that the at least one braking means works correctly and generates the braking force having the predetermined verification braking force value Fa.

Step e): determining that the at least one braking means 200 is malfunctioning when the actual acceleration reduction value is different from the expected acceleration reduction value.

Finally, in step e) it is determined that the at least one braking means 200 is malfunctioning when the effective acceleration reduction value is different from the expected acceleration reduction value, which was expected in the event that the braking means had functioned correctly by generating the braking force having the predetermined verification braking force value Fa.

Preferably, as regards the second embodiment just described, in step a) the at least one vehicle V may be moved along the rail according to a travel acceleration value. In this case, the expected acceleration reduction value is determined as a function of at least said predetermined verification braking force value Fa and the travel acceleration value with which said at least one vehicle V is moved.

Furthermore, always with reference to the second embodiment described, step e) may comprise:

e') verifying whether the actual acceleration reduction value differs from the expected acceleration reduction value by at least a predetermined tolerance value;

e") determining that the at least one braking means 200 is malfunctioning, if it has been verified that the actual acceleration reduction value differs from the expected acceleration reduction value by at least the predetermined tolerance value.

In other words, the difference must be greater than or equal to a predetermined tolerance value in order for the at least one braking means to be considered malfunctioning. In this way, the risk that any normal physiological variations of the actual acceleration reduction value are recognized as malfunctions of the at least one braking means 200 is reduced.

Again with reference to the second embodiment, preferably, the actual acceleration reduction value may be determined as a function of a first acceleration value of the vehicle measured before said at least one braking means is required to generate a braking force having a predetermined verification braking force value Fa on the at least one wheel or on the at least one axle, and a second vehicle acceleration value measured when said at least one braking means is required to generate a braking force having a predetermined verification braking force value Fa on the at least one wheel.

In a numerical example, if the first acceleration value of the vehicle, measured before said at least one braking means was required to generate a braking force having a predetermined verification braking force value Fa, is equal to 1 $m/s^2$ and the second acceleration value of the vehicle, measured when said at least one braking means is required to generate a braking force having a predetermined verification braking force value Fa on the at least one wheel, is equal to 0.9 $m/s^2$, the acceleration reduction will be $-0.1$ $m/s^2$, i.e. 1 $m/s^2$-0.9 $m/s^2$.

A further numerical example referring to the second embodiment is illustrated below. By means of the actuation signal, the at least one braking means 200 is required to generate a braking force having a predetermined verification braking force value Fa=4 KN. In the light of the verification braking force value Fa=4 kN, an expected acceleration reduction value of 0.6 $m/s^2$ is foreseen. However, due to a failure of at least one braking means, the effective braking force value actually generated is equal to 3 kN (i.e. smaller than the verification braking force value Fa). In view of this lack of braking force, an effective acceleration reduction value of at least one vehicle lower than the expected acceleration reduction value will be determined. For example, the determined effective acceleration reduction value will be 0.7 $m/s^2$. Since the actual acceleration reduction value determined is different from the expected acceleration reduction value, it will be determined that the at least one braking means 200 is malfunctioning.

A third embodiment of a method for verifying the operation of at least one braking means of at least one vehicle, in particular at least one railway vehicle, is described below. For this embodiment, reference may again be made to FIG. 2.

In this third embodiment, the at least one vehicle again comprises:

at least one wheel W or at least one axle to which at least one wheel is coupled, said at least one wheel being arranged to run on a rail 201;

at least one braking means 200 associated with said at least one wheel or associated with said at least one axle;

In this third embodiment, the method for verifying the operation of at least one braking means 200 comprises the steps described below.

Step a): moving said at least one vehicle 200 along said rail 201.

In other words, the vehicle V is moved along the rail.

Step b): providing said at least one braking means 200 with an actuation signal 503, 603 adapted to request said at least one braking means 200 to generate a braking force having a predetermined verification braking force value Fa on the at least one wheel W or on the at least one axle.

In other words, in step b) the braking means 200 is required to generate a braking force value Fa on the at least one wheel W or on the at least one axle.

Step c): when the at least one braking means 200 is required to generate a braking force having a predetermined verification braking force value Fa on the at least one wheel or on the at least one axle, measuring an actual acceleration value of the at least one vehicle.

In other words, in step c) an effective acceleration value of the at least one vehicle which is present when the at least one braking means should generate the braking force having the predetermined verification braking force value Fa is measured. Clearly, in case of correct operation of the at least one braking means 200, when the at least one braking means is required to generate the braking force having the predetermined verification braking force value Fa, the at least one braking means will generate a braking force having the predetermined verification braking force value Fa. Conversely, in the event of a malfunction of the at least one braking means 200, even if the at least one braking means was required to generate the braking force having the predetermined verification braking force value Fa, the at least one braking means 200 may not have generated any braking force or may have generated a braking force having a value other than said predetermined verification braking force value Fa. The effective acceleration value will therefore be a function of the braking force value which has actually been generated by the at least one braking means.

Step d) converting said actual acceleration value into an actual braking force value.

In other words, in step d), by means of suitable conversion formulas known to those skilled in the art, the effective acceleration value is converted into an effective braking force value.

Step e): comparing said actual braking force value with said verification braking force value Fa.

In other words, in step e) the actual braking force value is compared with the predetermined verification braking force value Fa, which is a value that is expected in case the braking means works correctly and is generating the braking force having the predetermined verification braking force value Fa.

Step f): determining that the at least one braking means 200 is malfunctioning when said actual braking force value is different from said verification braking force value Fa.

Finally, in step f) it is determined that the at least one braking means is malfunctioning when the actual braking force value is different from the verification braking force value Fa, which was expected in the case in which the braking means had worked properly by generating the braking force having the predetermined verification braking force value Fa.

With reference to the third embodiment just described, step f) may comprise:

f) verifying whether said actual braking force value differs from said verification braking force value Fa by at least a predetermined tolerance value;

f") determining that the at least one braking means is malfunctioning, if it has been verified that said actual braking force value differs from said verification braking force Fa at least said predetermined tolerance value.

In other words, the difference must be greater than or equal to a predetermined tolerance value in order for the at least one braking means to be considered malfunctioning. In this way, the risk that any normal physiological variations of the actual braking force value are recognized as malfunctions of the at least one braking means 200 is reduced.

The methods of the embodiments described up to now may for example be repeated in series for each wheel or axle of the vehicle. In a further possibility, the braking force having the predetermined verification braking force value Fa may be required from a plurality of braking means and the expected acceleration value may be determined as a function of the number of braking means which should generate the braking force having the predetermined verification braking force value Fa. In this way, several braking means may be tested simultaneously. In a still further possibility, the braking force having the predetermined verification braking force value Fa may be required overall from a plurality of braking means, i.e. the predetermined verification braking force value Fa may be divided over more braking means. The sum of the braking force values generated by the various braking means, when operating correctly, will be equal to the predetermined verification braking force value Fa. In this case, the expected acceleration value may be determined as a function of the predetermined total verification braking force value Fa which should be generated by the various braking means. In this way, several braking means may be tested simultaneously.

Further embodiments are given below which may be applied to all the embodiments described above.

Figure 3:
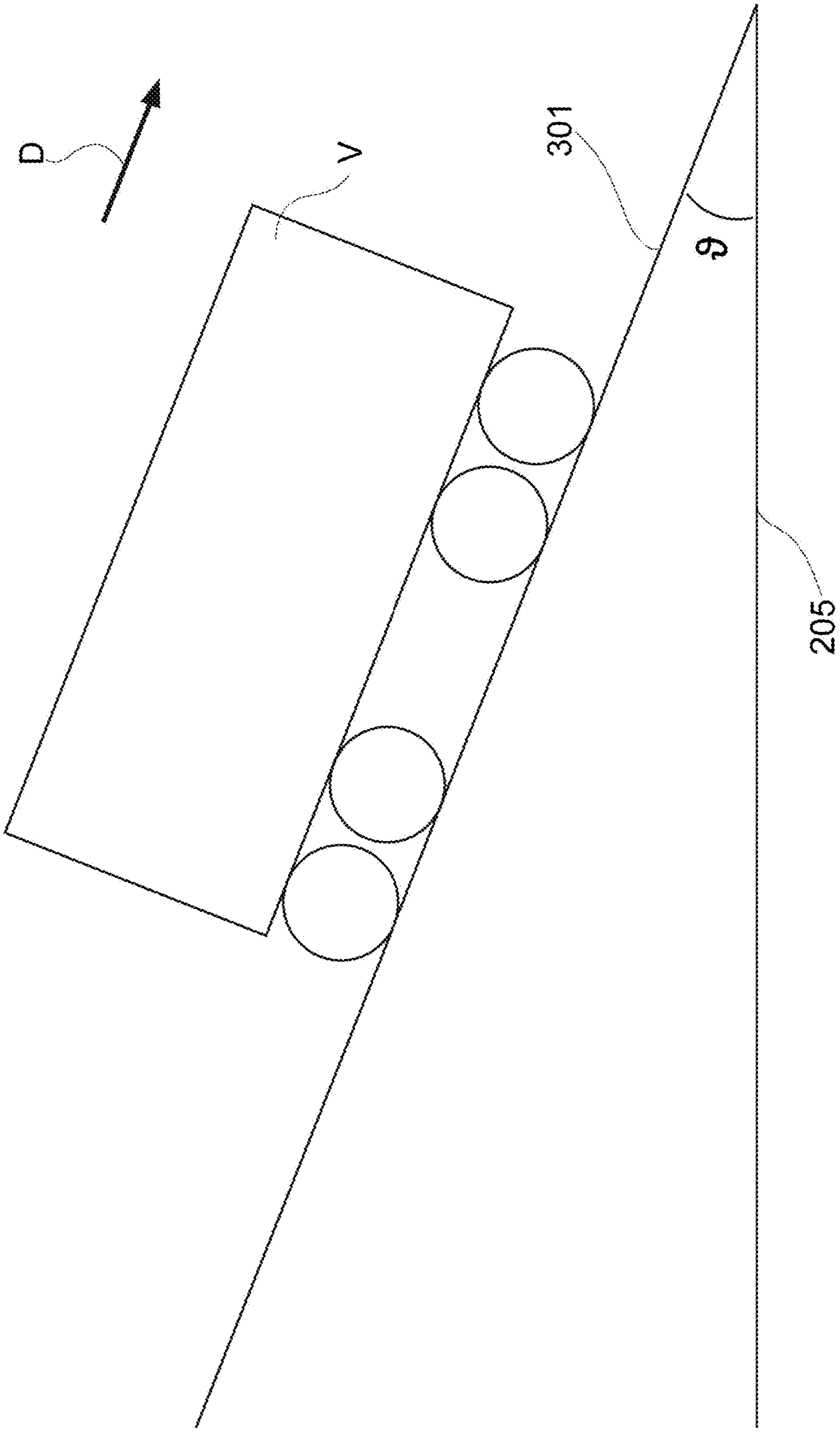
FIG. 3 illustrates an exemplary vehicle running on an inclined rail.

Preferably, as may be seen in FIG. 3, step a) may be performed by positioning the at least one vehicle V on an inclined rail 301.

In this case, the travel acceleration value may be generated by the effect of gravity.

Figure 4:
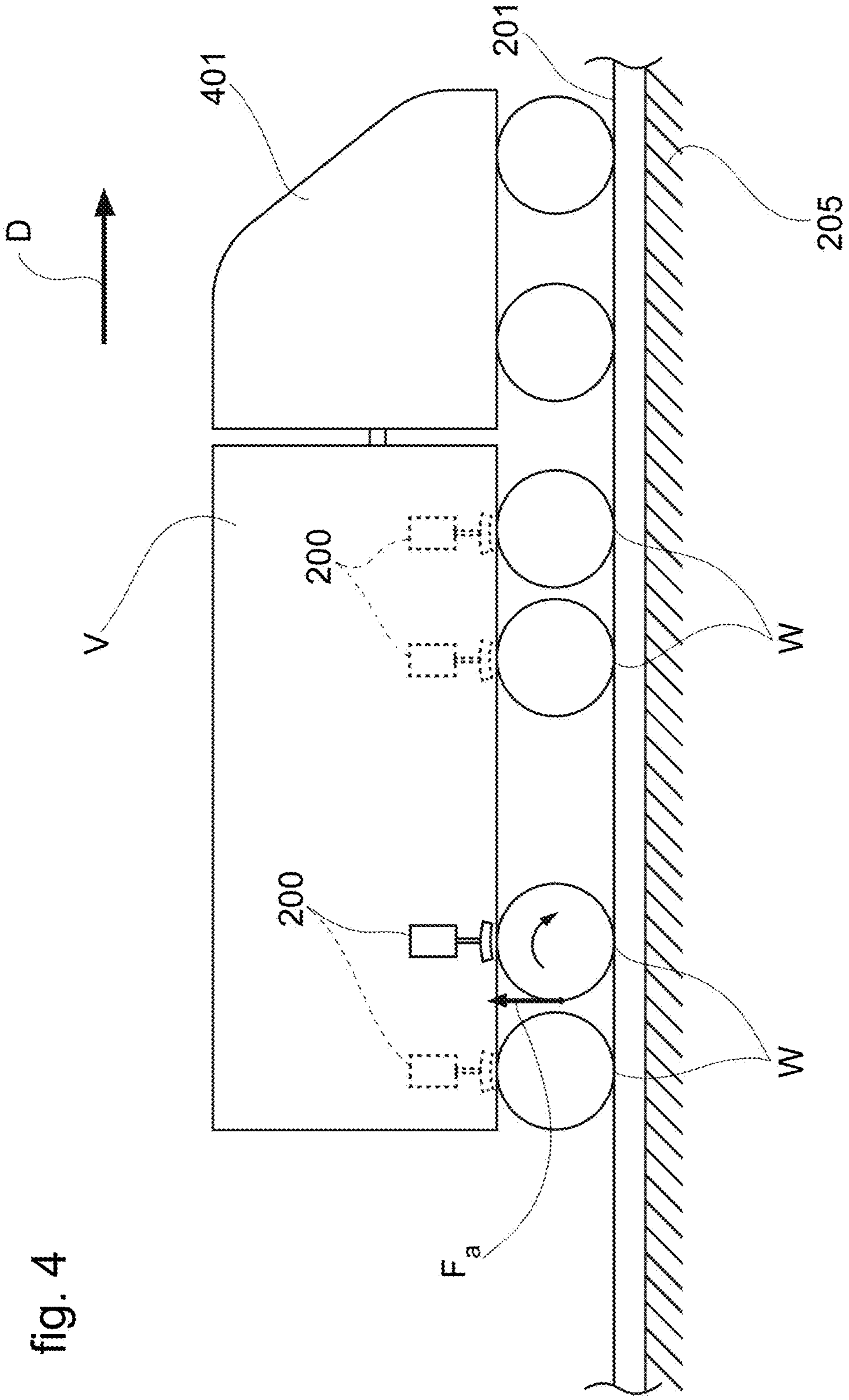
FIG. 4 illustrates an exemplary vehicle which is pulled by a locomotion means.

Or, or in addition, preferably, as may be seen in FIG. 4, step a) may be carried out by means of a locomotion means 401 arranged to pull the at least one vehicle along the rail 201.

Preferably, the travel acceleration value with which the locomotion means 401 pulls the at least one vehicle along said rail may be predetermined.

In one example, the travel acceleration value may be greater than 0 when the vehicle is moving according to an accelerated motion. Or, the travel acceleration value may be substantially equal to 0 when the vehicle V is moving according to a constant rectilinear motion.

For example, the at least one braking means may belong to, or be associated with, or be a pneumatic or electro-pneumatic or electrodynamic braking system. Some embodiments applicable for example in the case of pneumatic and/or electro-pneumatic and/or electrodynamic braking systems are reported below.

Preferably, the predetermined actuation signal may be a predetermined pneumatic actuation signal. Furthermore, the at least one vehicle may include a brake pipe adapted to allow the provision of the predetermined pneumatic actuation signal to the at least one braking means. In this case, step b) may include:

imposing, in the brake pipe, the predetermined pneumatic actuation signal having a pressure value adapted to cause the braking means, when properly operating, to generate the braking force having said predetermined verification braking force value.

In other words, the predetermined pneumatic actuation signal is generated by directly modifying the braking pressure value of the brake pipe, on each wheel to which the at least one braking means is associated. The braking force generated by the at least one braking means will depend on the braking pressure value provided by the brake pipe. When the predetermined pneumatic actuation signal is present in the brake pipe, all possible braking means connected to the brake pipe will be required to generate the verification braking force.

Preferably, the at least one braking means may include, for example, a braking cylinder to which a shoe or a pad is coupled, and may be arranged to act on a wheel or on a disc, respectively. The at least one braking means may further include a “distributor” valve, an auxiliary tank, a pneumatic weighing device, a mechanical transmission system.

Preferably, the predetermined actuation signal may be a predetermined electrical actuation signal. Furthermore, the at least one vehicle may include an electrical line adapted to allow the provision of the predetermined electrical actuation signal to the at least one braking means. In this case, step b) may include:

imposing on the electrical line the predetermined electrical actuation signal having a current or voltage value adapted to cause said braking means, when properly operating, to generate the braking force having the predetermined verification braking force value.

Preferably, the braking means may include, for example, an electromechanical assembly to which a shoe or a pad is coupled, and may be arranged to act on a wheel or on a disc, respectively. For example, the electromechanical assembly may comprise an electric motor. The electric motor may, for example, use electric energy to move a mechanical assembly, the movement of which may drive said shoe or pad.

In a further possibility, preferably, the at least one vehicle may comprise at least one local braking control means associated with the at least one braking means. Furthermore, step b) may include:

b') by means of the at least one braking control means, generating the actuation signal to said at least one braking means.

In this case, the predetermined actuation signal may again be a predetermined pneumatic actuation signal. The at least one vehicle may include a main pipe arranged to convey a braking pressure. In this case, step b') may include:

by means of the braking control means, generating the predetermined pneumatic actuation signal to be supplied to the at least one braking means, by means of a local adjustment of a pressure value of the braking pressure supplied by the main pipe;

providing the predetermined pneumatic actuation signal to the at least one braking means, the predetermined pneumatic actuation signal being adapted to cause said braking means, when properly operating, to generate the braking force having said predetermined verification braking force value.

In other words, for example, the value of the predetermined braking pressure provided by the main brake pipe may be maintained at a predetermined level, e.g. 8 bar-10 bar, but the braking control means may locally adjust the received braking pressure value, so that the effective braking pressure value supplied to the at least one braking means is such as to impose the verification braking force Fa on at least one wheel or on at least one axle. In this way, the braking force generated on each wheel by the one or more possible braking means present may be adjusted independently.

For example, the main brake pipe and/or the general brake pipe may be included in—or associated with—the pneumatic or electro-pneumatic braking system. In the case of a pneumatic or electro-pneumatic braking system, it may be controlled, for example, by a communication bus arranged along the at least one railway vehicle or along the railway convoy, in the case of a plurality of railway vehicles. By means of such bus, for example, it will be possible to provide the various braking controls to the one or more braking control means.

In a further aspect, the invention relates to systems for verifying the operation of at least one braking means of at least one vehicle, in particular at least one railway vehicle.

A first embodiment of a method for verifying the operation of at least one braking means of at least one vehicle, in particular at least one railway vehicle, is described below. For this embodiment, reference may be made to FIG. 5.

The at least one vehicle V includes:

at least one wheel or at least one axle to which at least one wheel is coupled; the at least one wheel is arranged to run on a rail 201;

at least one braking means 200 associated with the at least one wheel or associated with the at least one axle.

In this first embodiment, the system for verifying the operation of at least one braking means of at least one vehicle comprises an acceleration sensor means 500 arranged to measure acceleration values of the at least one vehicle, and a control means 502. The control means is arranged for:

providing the at least one braking means 200 with an actuation signal 503 adapted to request the at least one braking means 200 to generate a braking force having a predetermined verification braking force value Fa on the at least one wheel or on the at least one axle;

when said at least one braking means 200 is required to generate a braking force having a predetermined verification braking force value Fa on the at least one wheel or on the at least one axle, receiving from the acceleration sensor means 500 a data or signal 504 indicative of an actual acceleration value;

comparing the received actual acceleration value with an expected acceleration value;

determining that the at least one braking means 200 is malfunctioning when the actual acceleration value indicated by the data or signal transmitted by the acceleration sensor means is different from the expected acceleration reduction value.

A second embodiment of a method for verifying the operation of at least one braking means of at least one vehicle, in particular at least one railway vehicle, is described below. For this embodiment, reference may be made to FIG. 6. The at least one vehicle V again includes:

at least one wheel or at least one axle to which at least one wheel W is coupled; the at least one wheel is arranged to run on a rail 201;

at least one braking means 200 associated with the at least one wheel or associated with the at least one axle.

In this second embodiment, the system for verifying the operation of at least one braking means of at least one vehicle comprises a speed sensor means 600 arranged to measure speed values of the at least one vehicle, and a control means 602. The control means is arranged for:

providing the at least one braking means 200 with an actuation signal 603 adapted to request the at least one braking means to generate a braking force having the predetermined verification braking force value Fa on the at least one wheel or on the at least one axle;

when the at least one braking means is required to generate a braking force having the predetermined verification braking force value Fa on the at least one wheel or on the at least one axle, receiving from the speed sensor means 600 at least a first data or signal 604 indicative of a first speed value at a first instant of time and a second data or signal indicative of a second speed value at a second instant of time, subsequent to said first instant of time;

determining an actual acceleration value as a function of the first speed value, of the second speed value, and of the interval of time elapsed between said first instant of time and said second instant of time;

comparing the actual acceleration value with an expected acceleration value;

determining that the at least one braking means 200 is malfunctioning when the actual acceleration value is different from the expected acceleration value.

In a numerical example, the first speed value may be 10 m/s, the second speed value may be m/s and the time interval elapsed at the first time point, and the second time point is 1/s. For example, the actual acceleration value which is a function of the first speed value, the second speed value, and the time interval elapsed between said first instant of time and said second instant of time, may be equal to 5 $m/s^2$, i.e. (10 m/s-5 m/s)/1 s.

As regards the first embodiment of the system for verifying the operation of at least one braking means and the second embodiment of the system for verifying the operation of at least one braking means just described, preferably, the control means 502, 602 may be arranged to determine that the at least one braking means 200 is malfunctioning when the actual acceleration value differs from the expected acceleration value by at least a predetermined tolerance value.

Again with reference to the first embodiment of the system for verifying the operation of at least one braking means and to the second embodiment of the system for verifying the operation of at least one braking means just described, preferably, the control means 502, 602 may be arranged to determine the expected acceleration value as a function of at least the predetermined verification braking force value Fa and a travel acceleration value with which the at least one vehicle is moved prior to the request for generation of the braking force braking having a predetermined verification braking force value Fa on the at least one wheel or on the at least one axle of the vehicle.

A third embodiment of a system for verifying the operation of at least one braking means of at least one vehicle, in particular at least one railway vehicle, is described below. For this embodiment, reference may again be made to FIG. 5.

In this embodiment, the at least one vehicle V comprises:

at least one wheel W or at least one axle to which at least one wheel is coupled; the at least one wheel is arranged to run on a rail;

at least one braking means associated with said at least one wheel or associated with said at least one axle.

In the third embodiment, the system for verifying the operation of at least one braking means of at least one vehicle comprises an acceleration sensor means 500 arranged to measure acceleration values of the at least one vehicle, and a control means 502.

The control means 502 is arranged for:

providing said at least one braking means 200 with an actuation signal 503 adapted to request said at least one braking means 200 to generate a braking force having a predetermined verification braking force value Fa on the at least one wheel W or on the at least one axle;

when said at least one braking means 200 is required to generate a braking force having a predetermined verification braking force value Fa on the at least one wheel or on the at least one axle, receiving from the acceleration sensor means 500 a data or signal indicative of an actual acceleration value;

converting said actual acceleration value into an actual braking force value;

comparing said actual braking force value with said verification braking force value Fa;

determining that the at least one braking means is malfunctioning when said actual braking force value is different from said verification braking force value Fa.

With reference to the third embodiment just described, the control means 502 may be arranged to determine that the at least one braking means 200 is malfunctioning when said actual braking force value differs from said verification braking force value Fa by at least a predetermined tolerance value.

A fourth embodiment of a method for verifying the operation of at least one braking means of at least one vehicle, in particular at least one railway vehicle, is described below. For this embodiment, reference may again be made to FIG. 5. The at least one vehicle V again includes:

at least one wheel or at least one axle to which at least one wheel W is coupled; the at least one wheel is arranged to run on a rail 201;

at least one braking means 200 associated with the at least one wheel or associated with the at least one axle.

In this fourth embodiment, the system for verifying the operation of at least one braking means of at least one vehicle comprises an acceleration sensor means 500 arranged to measure an acceleration of the at least one vehicle, and a control means 502. The control means is arranged for:

providing the at least one braking means 200 with an actuation signal 503 adapted to request the at least one braking means 200 to generate a braking force having a predetermined verification braking force value Fa on the at least one wheel or on the at least one axle;

before requesting said at least one braking means 200 to generate the braking force having the predetermined verification braking force value Fa on the at least one wheel or on the at least one axle, receiving from the acceleration sensor means at least a first data or signal 504 indicative of a first acceleration value at a first instant of time;

when said at least one braking means is required to generate a braking force having the predetermined verification braking force value Fa on the at least one wheel or on the at least one axle, receiving from the acceleration sensor means at least a second data or signal 504 indicative of a second acceleration value at a second instant of time;

determining an actual acceleration reduction value as a function of the first acceleration value and the second acceleration value;

comparing said actual acceleration reduction value with an expected acceleration reduction value;

determining that the at least one braking means 200 is malfunctioning when said actual acceleration reduction value is different from said expected acceleration reduction value.

In a numerical example, the first acceleration value may be 1 $m/s^2$, the second acceleration value may be 0.7 $m/s^2$. For example, the actual acceleration reduction value which is a function of the first acceleration value and the second acceleration value, may be equal to −0.3 $m/s^2$, i.e. 0.7 $m/s^2$-1 $m/s^2$.

A fifth embodiment of a method for verifying the operation of at least one braking means of at least one vehicle, in particular at least one railway vehicle, is described below. For this embodiment, reference may again be made to FIG. 6. The at least one vehicle V again includes:

at least one wheel or at least one axle to which at least one wheel is coupled; the at least one wheel is arranged to run on a rail 201;

at least one braking means 200 associated with the at least one wheel or associated with the at least one axle.

In this fifth embodiment, the system for verifying the operation of at least one braking means of at least one vehicle comprises a speed sensor means 600 arranged to measure a speed of the at least one vehicle, and a control means 602. The control means 602 is arranged for:

providing the at least one braking means 200 with an actuation signal 603 adapted to request the at least one braking means to generate a braking force having a predetermined verification braking force value Fa on the at least one wheel or on the at least one axle;

before requesting said at least one braking means 200 to generate the braking force having the predetermined verification braking force value Fa on the at least one wheel or on the at least one axle, receiving from the speed sensor means at least a first data or signal 604 indicative of a first speed value at a first instant of time and a second data or signal 604 indicative of a second speed value at a second instant of time, subsequent to said first instant of time;

when said at least one braking means 200 is required to generate a braking force having the predetermined verification braking force value Fa on the at least one wheel or on the at least one axle, receiving from said at least one speed sensor means at least a third data or signal 604 indicative of a third speed value at a third instant of time and a fourth data or signal 604 indicative of a fourth speed value at a fourth instant of time, subsequent to said third instant of time;

determining an actual acceleration reduction value as a function of the first speed value, second speed value, third speed value, fourth speed value, a first time interval between said first instant of time and said second instant of time, and a second time interval between said third instant of time and said fourth instant of time;

comparing the actual acceleration reduction value with an expected acceleration reduction value;

determining that the at least one braking means is malfunctioning when the actual acceleration reduction value is different from the expected acceleration reduction value.

In a numerical example, the first speed value may be 10 m/s, the second speed value may be 9 m/s, and the first time interval may be 2 s. The third speed value may be 8 m/s, the fourth speed value may be 6 m/s and the time interval elapsed at the first time point, and the second time point is 0.5/s. For example, the actual acceleration reduction value which is a function of the first acceleration value, the second acceleration value, the third speed value, the fourth speed value, the first time interval elapsed between said first instant of time and said second instant of time and a second time interval elapsed between said third instant of time and said fourth instant of time, may be equal to −1.5 m/s$^2$, i.e. [(6 m/s-8 m/s)/1 s]−[(9 m/s-10 m/s)/2 s].

With reference to the fourth embodiment of the system for verifying the operation of at least one braking means and to the fifth embodiment of the system for verifying the operation of at least one braking means just described, preferably, the control means 502, 602 may be arranged to determine that the at least one braking means 200 is malfunctioning when the actual acceleration reduction value differs from the expected acceleration reduction value by at least a predetermined tolerance value.

Again with reference to the fourth embodiment of the system for verifying the operation of at least one braking means and to the fifth embodiment of the system for verifying the operation of at least one braking means, preferably, the control means 502, 602 may be arranged to determine the expected acceleration reduction value as a function of at least the predetermined verification braking force value Fa and a travel acceleration value with which the at least one vehicle is moved prior to the request for generation of the braking force braking having the predetermined verification braking force value Fa on at least one wheel or on the at least one axle of the vehicle.

Further embodiments are given below which may be applied to all embodiments of the system for verifying the operation of at least one braking means described above.

Figure 5:
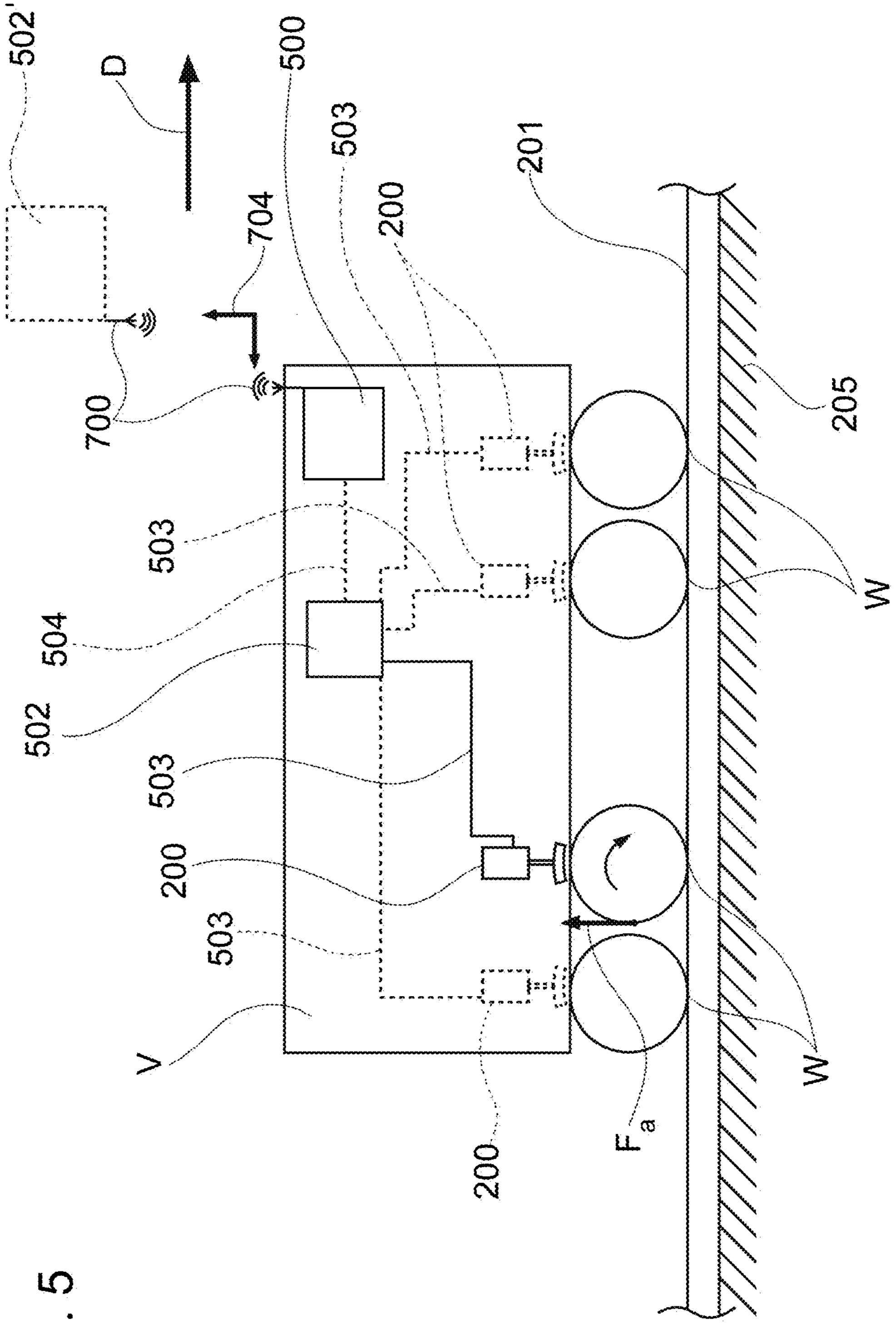
FIG. 5 illustrates an embodiment of a system for verifying the operation of at least one braking means of at least one vehicle according to the invention.
Figure 6:
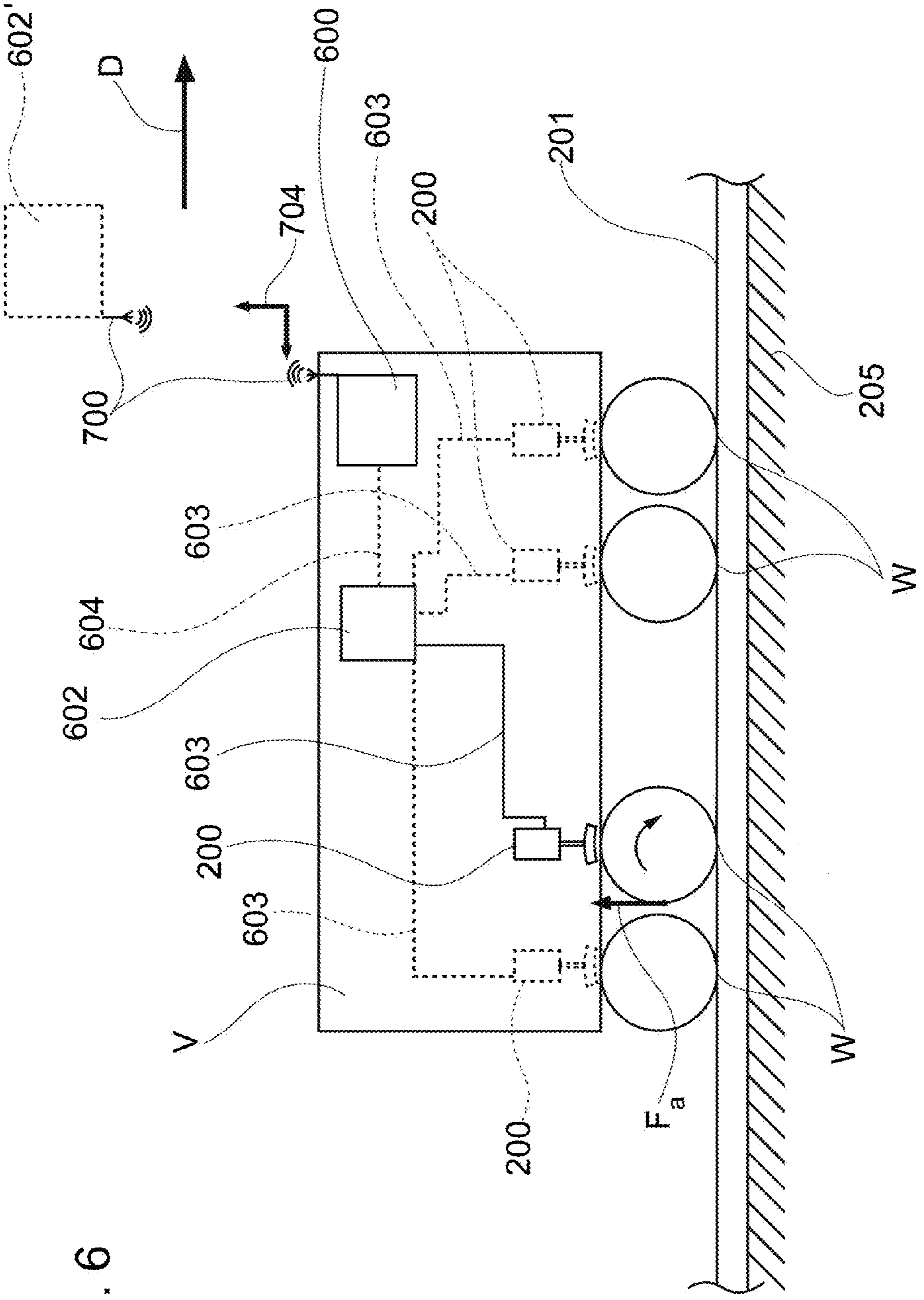
FIG. 6 illustrates a further embodiment of a system for verifying the operation of at least one braking means of at least one railway vehicle according to the invention.

As may be seen in FIG. 5 and FIG. 6, the control means 502, 602 may be installed on board the vehicle or remote from the vehicle.

In the first case, the control means 502, 602 and/or the acceleration sensor means 500 and/or the speed sensor means 600 may comprise respective wired or wireless communication means 700, e.g. radio, Bluetooth, Wi-Fi, for transmitting data or signals 704. In the second case, the control means 502, 602 and/or the acceleration sensor means 500 and/or the speed sensor means 600 may comprise the respective wireless communication means 700, e.g. radio, Bluetooth, Wi-Fi, for transmitting data or signals 704. Also the actuation signals 503, 603 may be supplied by the control means to the at least one braking means via wireless communication means 700.

Preferably, the system for verifying the operation of at least one braking means may comprise inclination sensor means, arranged to monitor an inclination angle of the at least one vehicle.

Preferably, the system for verifying the operation of at least one braking means may comprise weight sensor means, arranged to monitor a parameter associated with the mass of the at least one vehicle.

An example of how an expected acceleration reduction value can be determined is described below. The example refers to an exemplary railway vehicle moving along an inclined rail.

In the example, the railway vehicle includes four axles. Two wheels are coupled to each axle.

The at least one braking means may comprise four braking sub-assemblies. Each braking sub-assembly may be arranged to generate a braking force on a respective axle.

Or, the at least one braking means may comprise eight braking sub-assemblies. Each braking sub-assembly may be arranged to generate a braking force on a respective wheel.

In the example, the downhill vehicle may be controlled locally by the driver or remotely (i.e. by radio). By means of the acceleration sensor means or the speed sensor means of the system for verifying the operation of at least one braking means, it is possible to measure the travel speed and/or acceleration.

The acceleration sensor means or the speed sensor means fitted to the vehicle may also be read remotely.

For example, the acceleration sensor means may be or comprise at least an accelerometric sensor, such as an accelerometer, or a module arranged to measure the acceleration or determine the acceleration from further data from the vehicle, such as rotational speed of the vehicle. For example, the speed sensor means may comprise at least one speed sensor, such as a Hall effect speed sensor, or a module arranged to measure the speed or determine the speed from further data from the vehicle, such as vehicle speed rotation.

By means of the control means of the system for verifying the operation of at least one braking means, it is possible to supply to at least one braking means associated with at least one wheel of the vehicle or with an axle of the vehicle, an actuation signal adapted to request said at least one braking means to generate a braking force having a predetermined verification braking force value Fa on the at least one wheel or on the at least one axle. In other words, it is possible to supply to the braking means a braking request command having the predetermined known verification braking force value Fa.

Preferably, the control means may be or comprise at least one of: a processor, a microprocessor, a controller, a microcontroller, a PLC, an FPGA, or the like.

An exemplary case is shown below in which the at least one braking means comprises four braking sub-assemblies and each braking sub-assembly is arranged to generate a braking force on a respective axle, the verification braking force value Fa which the at least one braking means must generate may be a verification braking force of the entire vehicle. Therefore, the braking force to be generated on each axle is Fa/4.

Fb is the friction force exchanged by the vehicle wheels with the rail.

In this exemplary case, the vehicle is moving along an inclined rail according to a travel acceleration generated by gravity g. Knowing the mass of the vehicle M, the slope of the rail θ and the inertia of each axle J, and considering the translational balance of the vehicle and the rotational balance on the single axle:

$$\ddot{x} = g \sin\theta + Fb/M$$

$$Fb = \frac{4J\ddot{x}}{R^2} - Fa$$

where $\ddot{x}$ is the expected acceleration value.

By substituting, the value of the expected acceleration is obtained:

$$\ddot{x} = \frac{g \sin\theta - Fa/M}{1 - \frac{4J}{Mr^2}}$$

The above is clearly just an example of the various possible mathematical ways which may be used to determine the expected acceleration value. Additional mathematical formulas may be used.

Starting from these formulas, and substituting the expected acceleration value, with the actual acceleration value, and the verification braking force value Fa with the effective braking force value, the formula may be turned to obtain the actual braking force value.

Also in this case, the one reported above is clearly only an example of the various possible mathematical ways that may be used to determine the actual braking force value. Additional mathematical formulas may be used.

The advantage achieved is therefore that of having provided solutions which allow a possible malfunction of at least one braking means of at least one vehicle to be determined, which are effective and which do not involve high costs as regards both the hardware components and the installation and update costs of a possible complete fleet.

A further advantage is that of having provided solutions which do not involve onerous development and certification costs.

Several aspects and embodiments of methods for verifying the operation of at least one braking means of at least one vehicle and systems for verifying the operation of at least one braking means of at least one vehicle according to the invention have been described. It is understood that each embodiment may be combined with any other embodiment. Moreover, the invention is not limited to the embodiments described, but may be varied within the scope defined by the appended claims.

The invention claimed is:

1. A method for verifying an operation of at least one braking means of at least one vehicle (V), particularly at least one railway vehicle, wherein said at least one vehicle comprises:

at least one wheel (W) or at least one axle to which at least one wheel is coupled, said at least one wheel being arranged to run on a rail;

said at least one braking means associated with said at least one wheel or associated with said at least one axle;

said method for verifying the operation of said at least one braking means comprising the steps of:

a) moving said at least one vehicle along said rail;

b) providing said at least one braking means with an actuation signal adapted to request said at least one braking means to generate a braking force having a predetermined verification braking force value (Fa) on the at least one wheel (W) or on the at least one axle, wherein the predetermined verification braking force value (Fa) is a predetermined known braking force value that said at least one braking means is expected to generate when properly operating in response to said actuation signal;

c) when said at least one braking means is required to generate a braking force having a predetermined verification braking force value (Fa) on the at least one wheel or on the at least one axle, measuring an actual acceleration value of the at least one vehicle;

d) comparing the actual acceleration value with an expected acceleration value;

e) determining that the at least one braking means is malfunctioning when said actual acceleration value is different from said expected acceleration value.

2. The method for verifying the operation of at least one braking means according to claim 1, wherein in step a) said at least one vehicle (V) is moved along said rail according to a travel acceleration value;

wherein said expected acceleration value is determined as a function of at least said predetermined verification braking force value (Fa) and said travel acceleration value with which said at least one vehicle is moved in step a).

3. The method for verifying the operation of at least one braking means according to claim 1, wherein said step e) comprises:

e') verifying whether said actual acceleration value differs from said expected acceleration value by at least a predetermined tolerance value;

e") determining that the at least one braking means is malfunctioning, if it has been verified that said actual acceleration value differs from said expected acceleration value by at least said predetermined tolerance value.

4. The method for verifying the operation of at least one braking means according to claim 1, wherein said actuation signal is a predetermined pneumatic actuation signal;

wherein, said at least one vehicle comprises a brake pipe adapted to allow said predetermined pneumatic actuation signal to be provided to the at least one braking means;

wherein said step b) comprises:

imposing, in said brake pipe, the predetermined pneumatic actuation signal having a pressure value adapted to cause said braking means, when properly operating, to generate the braking force having said predetermined verification braking force value.

5. A method for verifying operation of at least one braking means of at least one vehicle (V), particularly at least one railway vehicle, where said at least one vehicle comprises:

at least one wheel (W) or at least one axle to which at least one wheel is coupled, said at least one wheel being arranged to run on a rail;

at least one braking means associated with said at least one wheel or associated with said at least one axle;

said method for verifying the operation of said at least one braking means comprising the steps of:

a) moving said at least one vehicle (V) along said rail;

b) providing said at least one braking means with an actuation signal adapted to request said at least one braking means to generate a braking force having a predetermined verification braking force value (Fa) on the at least one wheel or on the at least one axle, wherein the predetermined verification braking force value (Fa) is a predetermined known braking force value that said at least one braking means is expected to generate when properly operating in response to said actuation signal;

c) when said at least one braking means is required to generate a braking force having the predetermined verification braking force value (Fa) on the at least one wheel or on the at least one axle, determining an actual acceleration reduction value of the at least one vehicle which is caused by an actual braking force generated by the at least one braking means in response to a received actuation signal;

c) when said at least one braking means is required to generate a braking force having the predetermined verification braking force value (Fa) on the at least one wheel or on the at least one axle, determining an actual acceleration reduction value of the at least one vehicle which is caused by an actual braking force generated by the at least one braking means in response to a received actuation signal;

e) determining that the at least one braking means is malfunctioning when said actual acceleration reduction value is different from said expected acceleration reduction value.

6. The method for verifying the operation of at least one braking means according to claim 5, wherein in step a) said at least one vehicle is moved along said rail according to a travel acceleration value;

wherein said expected acceleration reduction value is determined as a function of at least said predetermined verification braking force value (Fa) and said travel acceleration value with which said at least one vehicle is moved.

7. The method for verifying the operation of at least one braking means according to claim 5, wherein said actual acceleration reduction value is determined as a function of a first acceleration value of the vehicle measured before said at least one braking means is required to generate a braking force having a predetermined verification braking force value (Fa) on the at least one wheel or on the at least one axle, and a second vehicle acceleration value measured when said at least one braking means is required to generate a braking force having a predetermined verification braking force value (Fa) on the at least one wheel.

8. The method for verifying the operation of at least one braking means according to claim 5, wherein said step e) comprises:

e') verifying whether said actual acceleration reduction value differs from said expected acceleration reduction value by at least a predetermined tolerance value;

e") determining that the at least one braking means is malfunctioning, if it has been verified that said actual acceleration reduction value differs from said expected acceleration reduction value by at least said predetermined tolerance value.

9. The method for verifying the operation of at least one braking means according to claim 5, wherein said actuation signal is a predetermined pneumatic actuation signal;

wherein, said at least one vehicle comprises a brake pipe adapted to allow the provision of said predetermined pneumatic actuation signal to the at least one braking means;

wherein said step b) comprises:

imposing, in said brake pipe, the predetermined pneumatic actuation signal having a pressure value adapted to cause said braking means, when properly operating, to generate the braking force having said predetermined verification braking force value.

10. The method for verifying the operation of at least one braking means according to claim 9, wherein said actuation signal is a predetermined electrical actuation signal;

wherein, said at least one vehicle comprises an electrical line arranged to allow supply of said predetermined electrical actuation signal to the at least one braking means;

wherein said step b) comprises:

imposing on said electrical line the predetermined electrical actuation signal having a current or voltage value adapted to cause said braking means, when properly operating, to generate the braking force having said predetermined verification braking force value.

11. The method for verifying the operation of at least one braking means according to claim 9, wherein, said at least one vehicle comprises at least one local braking control means associated with said at least one braking means;

wherein said step b) comprises:

b') by means of said least one braking control means, generating the actuation signal to said at least one braking means.

12. The method for verifying the operation of the at least one braking means according to claim 11, wherein said predetermined actuation signal is a predetermined pneumatic actuation signal;

wherein said at least one vehicle comprises a main pipe arranged to convey a braking pressure, wherein step b') comprises:

by means of the braking control means, generating said predetermined pneumatic actuation signal to be provided to the at least one braking means, through a local adjustment of a pressure value of the braking pressure provided by the main pipe;

supplying said predetermined pneumatic actuation signal to the at least one braking means, said predetermined pneumatic actuation signal being adapted to cause said braking means, when properly operating, to produce the braking force having said predetermined braking force verification value.

13. A system for verifying operation of at least one braking means of at least one vehicle, particularly at least one railway vehicle, wherein said at least one vehicle (V) comprises:

at least one wheel (W) or at least one axle to which at least one wheel is coupled, said at least one wheel being arranged to run on a rail;

at least one braking means associated with said at least one wheel or associated with said at least one axle;

said system for verifying the operation of at least one braking means of at least one vehicle comprising:

an acceleration sensor means arranged to measure acceleration values of the at least one vehicle; and a control means;

said control means is arranged for:

providing said at least one braking means with an actuation signal adapted to request said at least one braking means to generate a braking force having a predetermined verification braking force value (Fa) on the at least one wheel (W) or on the at least one axle, wherein the predetermined verification braking force value (Fa) is a predetermined known braking force value that said at least one braking means is expected to generate when properly operating in response to said actuation signal;

when said at least one braking means is required to generate a braking force having a predetermined verification braking force value (Fa) on the at least one wheel or on the at least one axle, receiving from the acceleration sensor means a data or signal indicative of an actual acceleration value;

comparing said received actual acceleration value with an expected acceleration value;

determining that the at least one braking means is malfunctioning when said actual acceleration value indicated by the data or signal transmitted by the acceleration sensor means is different from said expected acceleration reduction value.

14. System for verifying the operation of at least one braking means according to claim 13, wherein said control means is arranged to determine that the at least one braking means is malfunctioning when said actual acceleration value differs from said expected acceleration value by at least a predetermined tolerance value.

15. The system for verifying the operation of at least one braking means according to claim 13, wherein said braking means is arranged to determine the expected acceleration value as a function of at least said predetermined verification braking force value (Fa) and a travel acceleration value with which the at least one vehicle is moved prior to the request for generation of the braking force having a predetermined verification braking force value (Fa) on the at least one wheel or on the at least one axle of the vehicle.

16. A system for verifying operation of at least one braking means of at least one vehicle, particularly at least one railway vehicle, wherein said at least one vehicle (V) comprises:

at least one wheel (W) or at least one axle to which at least one wheel is coupled, said at least one wheel being arranged to run on a rail;

at least one braking means associated with said at least one wheel or associated with said at least one axle;

said system for verifying the operation of at least one braking means of at least one vehicle comprising:

a speed sensor means arranged to measure speed values of the at least one vehicle; and a control means;

said control means being arranged for:

providing said at least one braking means with an actuation signal adapted to request said at least one braking means to generate a braking force having a predetermined verification braking force value (Fa) on the at least one wheel or on the at least one axle, wherein the predetermined verification braking force value (Fa) is a predetermined known braking force value that said at least one braking means is expected to generate when properly operating in response to said actuation signal;

when said at least one braking means is required to generate a braking force having the predetermined verification braking force value (Fa) on the at least one wheel or on the at least one axle, receiving from the speed sensor means at least a first data or signal indicative of a first speed value at a first instant of time and a second data or signal indicative of a second speed value at a second instant of time, subsequent to said first instant of time;

determining an actual acceleration value as a function of the first speed value, of the second speed value, and of an interval of time elapsed between said first instant of time and said second instant of time;

comparing said actual acceleration value with an expected acceleration value;

determining that the at least one braking means is malfunctioning when said actual acceleration value is different from said expected acceleration value.

17. The system for verifying the operation of at least one braking means according to claim 16, wherein said control means is arranged to determine that the at least one braking means is malfunctioning when said actual acceleration value differs from said expected acceleration value by at least a predetermined tolerance value.

18. The system for verifying the operation of at least one braking means according to claim 16, wherein said braking means is arranged to determine the expected acceleration value as a function of at least said predetermined verification braking force value (Fa) and a travel acceleration value with which the at least one vehicle is moved prior to the request for generation of the braking force having a predetermined verification braking force value (Fa) on the at least one wheel or on the at least one axle of the vehicle.

19. The system for verifying the operation of at least one braking means according to claim 16, comprising:

a tilt sensor means, arranged to monitor an angle of inclination of the at least one vehicle.

20. The system for verifying the operation of at least one braking means according to claim 16, comprising:

a weight sensor means, arranged to monitor a parameter associated with the mass of the at least one vehicle.

* * * * *